J. GALLOWAY.
Seeding-Machines.

No. 149,387.  Patented April 7, 1874.

WITNESSES
Colborne Brookes
Andrew McCallum

INVENTOR
James Galloway,
by W. B. Richards,
atty.

UNITED STATES PATENT OFFICE.

JAMES GALLOWAY, OF CHANDLERVILLE, ILLINOIS.

IMPROVEMENT IN SEEDING-MACHINES.

Specification forming part of Letters Patent No. 149,387, dated April 7, 1874; application filed February 11, 1874.

*To all whom it may concern:*

Be it known that I, JAMES GALLOWAY, of Chandlerville, county of Cass and State of Illinois, have invented certain Improvements in Seeding-Machines, of which the following is a specification:

The nature of my invention relates to improvements in seed-drills; and the invention consists in the arrangement, within hollow rotary furrow-openers, of a seed-carrying device, and suitable mechanism for distributing the seed or withdrawing it from said device or receptacle, operated by the action of the interior surface of the hollow rotary furrow-opener upon a friction-wheel, all as hereinafter fully described.

Figure 1:
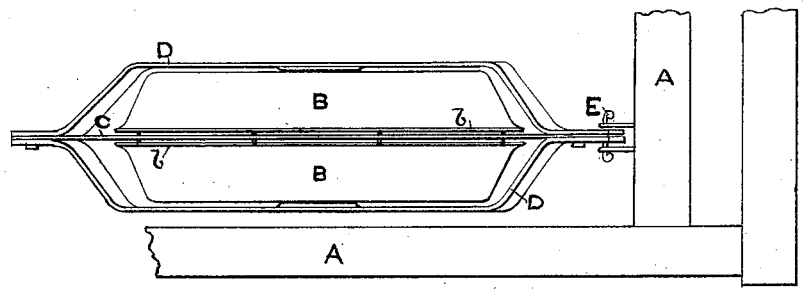
Figure 2:
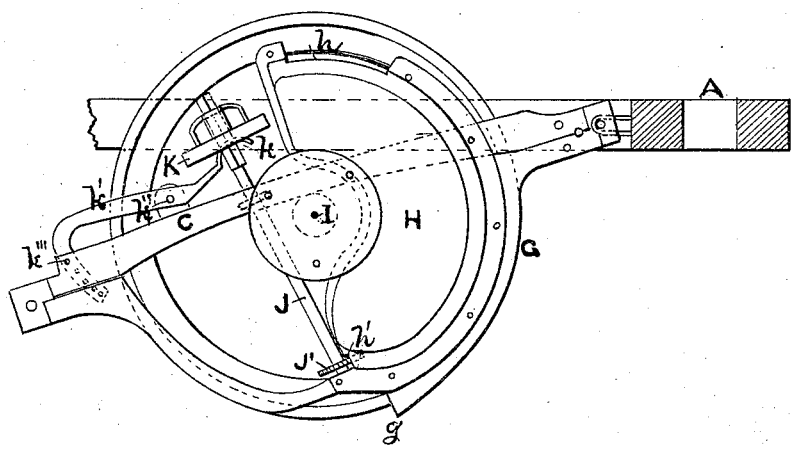

In the accompanying drawings, Figure 1 is a top-plan view of one of my improved rotary seeders, together with a portion of the frame in which it is suspended for operation; and Fig. 2 is a side elevation with the front side of seeder removed.

Referring to the parts by letters, letters A represent a part of a frame in which the device is suspended for operation. B B are the two sides of a rotary hollow wheel, with annular flanges $b$ $b$ at their adjacent edges. C is a bar passing centrally through and between the sides B B, and projecting at either side therefrom. D D are bars in a line with the bar C, but exterior to the sides B B, and secured at their ends to the ends of the bar C. E is a pin through the front ends of the bars C D D, by which the device is pivoted to the frame A in any suitable manner which will hold it in an upright position. G is an arc-shaped plate fitting the curve of the flanges $b$ $b$, and placed between them, as shown in the drawings, occupying the lower front side of the circle, so as to close the wheel at that point and leave an opening in rear of its lower end at $g$. H is the seed-box proper, occupying one side and front of the interior of the hollow wheel, with an opening, $h$, at its upper end, through which it may be supplied with seed, and a slot, $h'$, in its lower rear side, through which the seed may be extracted, as hereinafter described. I is the axial bolt on which the wheel B is rotated, and has bearings in the side bars D D. J is a shaft within the wheel B, and has suitable bearings in the bar C and in a projecting lug from the rear side of the seed-box H, and carries on its upper end a friction-wheel, K, so attached that it may be adjusted in position longitudinally thereon by a clutch, $k$, which is in turn carried on one end of an arm, $k'$, pivoted centrally at $k''$ on a projecting stud from the bar C, and its outer end extending outward beyond the wheel, where it is bent, as shown, and pierced with holes $k'''$, through which a pin may be inserted for adjusting it. $J'$ is a wheel on the lower end of the shaft J, and has ratchet-shaped teeth on its circumferential edge. It is so situated as to extend within the slot $h'$.

The operation of my invention is as follows: The seed is supplied to the seed-box H through the opening $h$ in its upper end. The rotation of the wheel B will revolve the shaft J by means of the friction-wheel K, and the ratchet-teeth on the wheel J will, in rotating, withdraw the seed through the slot $h'$ with a rapidity proportioned to its rapidity of revolution, which may be made faster or slower, in relation to the rotation of the wheel B, by adjusting it higher or lower, respectively, on the shaft J by means of the lever $k'$, in the obvious manner. The flanges $b$ will open the furrow, and the seed, dropping through the opening $g$, will be deposited therein, the action of the wheel tending to cover them.

Any number of wheels B may be mounted within a frame, A, to drill numbers of rows at the same time.

I claim—

1. The hollow wheel B, constructed as described, in combination with the seed-box H, shaft J, friction-wheel K, toothed wheel $J'$, and bars D D, substantially as and for the purpose specified.

2. The lever $k'$, in combination with the friction-wheel K, shaft J, seed-box H, and hollow wheel B, substantially as and for the purpose specified.

JAMES GALLOWAY.

Witnesses:
J. J. TUNNICLIFF,
M. H. BARRINGER.